United States Patent
Watanabe et al.

(10) Patent No.: US 8,921,246 B2
(45) Date of Patent: Dec. 30, 2014

(54) GLASS COMPOSITION AND OPTICAL DEVICE

(75) Inventors: Tomohiro Watanabe, Yokohama (JP); Taihei Mukaide, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 13/580,603

(22) PCT Filed: Feb. 23, 2011

(86) PCT No.: PCT/JP2011/054666
§ 371 (c)(1),
(2), (4) Date: Aug. 22, 2012

(87) PCT Pub. No.: WO2011/105612
PCT Pub. Date: Oct. 1, 2011

(65) Prior Publication Data
US 2012/0319015 A1    Dec. 20, 2012

(30) Foreign Application Priority Data
Feb. 26, 2010  (JP) ................................. 2010-043331

(51) Int. Cl.
*C03C 3/062* (2006.01)
*C03C 3/095* (2006.01)
*C03C 4/00* (2006.01)

(52) U.S. Cl.
CPC .............. *C03C 3/062* (2013.01); *C03C 4/0085* (2013.01)
USPC ............................................ 501/73; 501/64

(58) Field of Classification Search
CPC ...... C03C 3/062; C03C 3/095; C03C 4/0085; C03C 17/001; C03C 17/002; G01J 5/522
USPC .................... 501/64, 73; 204/192.26, 298.13; 250/504 R; 362/84, 257; 428/426–434
See application file for complete search history.

(56) References Cited

U.S. PATENT DOCUMENTS 6,482,758 B1 * 11/2002 Weber et al. .................... 501/41
7,935,947 B2 * 5/2011 Watanabe et al. ......... 250/504 R
(Continued)

FOREIGN PATENT DOCUMENTS

| WO | 01/27046 A1 | 4/2001 |
| WO | 2008/062898 A1 | 5/2008 |
| WO | 2009/060984 A1 | 5/2009 |

OTHER PUBLICATIONS

Iftekhar et al., "Slass Formation and Structure-Property-Composition Relations of the RE2O3-Al2O3-SiO2 (RE=La, Y, Lu, Sc) Systems", 2011, J. Am. Ceram. Soc. 94[8] 2429-2435.*

(Continued)

*Primary Examiner* — Karl Group
*Assistant Examiner* — Elizabeth A Bolden
(74) *Attorney, Agent, or Firm* — Canon U.S.A. Inc., IP Division (57) ABSTRACT

There is provided a glass composition containing an oxide containing Lu, Si, and Al, in which the composition of the glass composition lies within a compositional region of a ternary composition diagram of Lu, Si, and Al in terms of cation percent, the compositional region being defined by the following six points:
(32.3% $LuO_{3/2}$, 30.0% $SiO_2$, 37.7% $AlO_{3/2}$),
(32.3% $LuO_{3/2}$, 37.7% $SiO_2$, 30.0% $AlO_{3/2}$),
(20.8% $LuO_{3/2}$, 55.0% $SiO_2$, 24.2% $AlO_{3/2}$),
(10.0% $LuO_{3/2}$, 45.0% $SiO_2$, 45.0% $AlO_{3/2}$),
(20.8% $LuO_{3/2}$, 24.2% $SiO_2$, 55.0% $AlO_{3/2}$), and
(30.0% $LuO_{3/2}$, 25.0% $SiO_2$, 45.0% $AlO_{3/2}$).
For the glass composition, a glassy state having low or no intrinsic birefringence in the ultraviolet region is stably obtained.

8 Claims, 6 Drawing Sheets

◉ RANGE OF GLASS COMPOSITION OF INVENTION
○ SUCCESSFULLY VITRIFIED COMPOSITION
◇ PARTIALLY CRYSTALLIZED OR PHASE-SEPARATED COMPOSITION
× COMPLETELY CRYSTALLIZED COMPOSITION (56) References Cited

U.S. PATENT DOCUMENTS

2005/0075233 A1* 4/2005 Weber et al. .................... 501/41
2009/0004427 A1* 1/2009 Sarrafi-Nour et al. .......... 428/76
2009/0124481 A1* 5/2009 Fu .................................. 501/78
2010/0096565 A1* 4/2010 Mukaide et al. ........... 250/492.1

OTHER PUBLICATIONS

John H. Burnett, Simon G. Kaplan, Eric L. Shirley, Paul J. Tompkins, and James E. Webb, "High-Index Materials for 193 nm Immersion Lithography", Proceedings SPIE 5754-57 (2005).

* cited by examiner

FIG. 1

◎ RANGE OF GLASS COMPOSITION OF INVENTION
○ SUCCESSFULLY VITRIFIED COMPOSITION
◇ PARTIALLY CRYSTALLIZED OR PHASE-SEPARATED COMPOSITION
✕ COMPLETELY CRYSTALLIZED COMPOSITION

GLASS COMPOSITION AND OPTICAL DEVICE

TECHNICAL FIELD

The present invention relates to a glass composition and an optical device, and in particular, to a glass composition suitable for an optical member for use in an optical device using ultraviolet light, and to an optical device using the glass composition.

BACKGROUND ART

Optical members have been used for a wide range of applications including cameras, telescopes, and so forth. Optical members can be broadly categorized into two groups: crystal optical members and glass optical members. Applications of crystal optical members vary depending on their crystal systems. Cubic crystals are used as lenses for imaging optical systems and so forth. The use of cubic crystals with high optical isotropy results in a reduction in, for example, birefringence due to optical anisotropy. Glass optical members are essentially optically isotropic and thus can be widely used, only considering stress-induced birefringence.

With respect to a glass composition, PTL 1 discloses a glass containing 50 mole percent to 77 mole percent aluminum oxide ($Al_2O_3$) and 27 mole percent to 50 mole percent rare-earth oxide ($RE_2O_3$). PTL 1 also discloses lutetium (Lu) as a rare-earth element (RE). Furthermore, PTL 1 discloses a bulk single phase glass that lies within the heptagonal region of the ternary composition diagram of a $RE_2O_3$—$Al_2O_3$—$SiO_2$ system defined by seven points having mole percent compositions described below.

That is, the seven points are as follows:
(1% $RE_2O_3$, 59% $Al_2O_3$, 40% $SiO_2$),
(1% $RE_2O_3$, 71% $Al_2O_3$, 28% $SiO_2$),
(23% $RE_2O_3$, 77% $Al_2O_3$, 0% $SiO_2$),
(50% $RE_2O_3$, 50% $Al_2O_3$, 0% $SiO_2$),
(50% $RE_2O_3$, 0% $Al_2O_3$, 50% $SiO_2$),
(33% $RE_2O_3$, 33.33% $Al_2O_3$, 33.33% $SiO_2$), and
(16.67% $RE_2O_3$, 50% $Al_2O_3$, 33.33% $SiO_2$).
In the case where the units of the mole percent compositions of the points are converted into cation percent, the points are indicated by closed circles in the ternary composition diagram of FIG. 6.

PTL 1 also discloses a bulk single phase glass containing
(a) 1 mole percent to 50 mole percent $RE_2O_3$,
(b) 0 mole percent to 71 mole percent $Al_2O_3$,
(c) 0 mole percent to 35 mole percent $SiO_2$, and
(d) 0 mole percent to 15 mole percent other oxides,
in which the total concentration of $RE_2O_3$ and $Al_2O_3$ is at least 55 mole percent. Furthermore, lutetium (Lu) is disclosed as a rare-earth element (RE). In the case where the units of the mole percent compositions of the points are converted into cation percent, the points are indicated by closed rhombuses in the ternary composition diagram of FIG. 6.

PTL 1 discloses a glass according to the foregoing technique, the glass being usable in optical applications where uniform mechanical and thermal properties are required. PTL 1 also discloses a homogenous bulk single phase glass and a glass with a high refractive index according to the foregoing technique.

Higher integration of semiconductor integrated circuits has increasingly required ultrafine pattern formation. A reduction projection exposure apparatus (stepper) using a step-and-repeat process for transferring a fine pattern onto a wafer grows more sophisticated. The wavelength of light emitted from a light source for exposure is shifted to a short wavelength. An optical member that receives attention in optical members for that purpose is a cubic calcium fluoride single crystal having a high transmittance in the ultraviolet region. In recent years, attempts have been made to develop optical members containing elements, such as Lu, Al, and Mg, which has a higher refractive index than Si, in order to achieve a higher refractive index of an optical member to provide a higher resolution. For example, development of cubic crystals, such as lutetium aluminum garnet single crystal (LuAG, $Lu_3Al_5O_{12}$), magnesium oxide single crystal (MgO), and magnesium spinel single crystal ($MgAl_2O_4$), have been actively conducted. In particular, the lutetium aluminum garnet single crystal has a high refractive index and thus is a promising candidate. For example, the lutetium aluminum garnet single crystal has a refractive index of 2.1 at a wavelength of 193 nm. Silica glass has a refractive index of 1.56 at a wavelength of 193 nm. The calcium fluoride single crystal has a refractive index of 1.50 at the wavelength of 193 nm.

Single crystal materials disadvantageously exhibit intrinsic birefringence in the ultraviolet region. MgO and $MgAl_2O_4$ have intrinsic birefringence values of 70 nm/cm (extrapolated value) and 52 nm/cm (extrapolated value), respectively, which are much larger than that (3.4 nm/cm) of $CaF_2$ (for example, see NPL 1). Thus, the development of a material that does not have intrinsic birefringence is required.

PTL 2 discloses a glass composition for ultraviolet light, the glass composition containing Lu, Al, and O, in which the total proportion of Lu, Al, and O is 99.99% by weight or more, and the glass composition contains 24% to 33% Lu and 67% to 76% Al in terms of cation percent.

PTL 2 discloses a glass composition for ultraviolet light, the glass composition being suitable for a final lens of an immersion projection-type exposure apparatus, having a high refractive index and a high transmittance, and exhibiting low or no intrinsic birefringence (IBR) or low or no stress birefringence (SBR), and discloses an optical device using the glass composition.

PTL 1 discloses a homogeneous single phase glass having a high refractive index and being usable for optical applications. However, the glass has a low transmittance in the ultraviolet region. Furthermore, there is a problem in which a relatively stable, large-sized glass cannot be produced.

PTL 2 discloses a glass composition with a novel composition for ultraviolet light, the glass composition being suitable for a final lens of an immersion projection-type exposure apparatus, having a high refractive index and a high transmittance, and exhibiting low or no intrinsic birefringence and low or no stress birefringence. However, the glass-forming region is narrow, thereby failing to produce a relatively stable, large-sized glass.

In the case where a single crystal, such as LuAG, is used as an optical material, the single crystal exhibits intrinsic birefringence. Thus, the intrinsic birefringence needs to be compensated by, for example, a combination of lenses having different crystal orientations.

CITATION LIST

Patent Literature

PTL 1 WO 01/27046
PTL 2 US 2010/0096565

Non Patent Literature

NPL 1 John H. Burnett, Simon G. Kaplan, Eric L. Shirley, Paul J. Tompkins, and James E. Webb, "High-Index Materials for 193 nm Immersion Lithography", Proceedings SPIE 5754-57 (2005)

SUMMARY OF INVENTION

The present invention has been made in light of the circumstances described above. Aspects of the present invention provide a glass composition in which a glassy state having low or no intrinsic birefringence in the ultraviolet region is stably obtained.

Aspects of the present invention provide an optical material, an optical thin film, and an optical device using the glass composition.

Solution to Problem

A glass composition that overcomes the foregoing problems contains an oxide containing Lu, Si, and Al, in which the composition of the glass composition lies within a compositional region of a ternary composition diagram of Lu, Si, and Al in terms of cation percent, the compositional region being defined by the following six points:
(32.3% $LuO_{3/2}$, 30.0% $SiO_2$, 37.7% $AlO_{3/2}$),
(32.3% $LuO_{3/2}$, 37.7% $SiO_2$, 30.0% $AlO_{3/2}$),
(20.8% $LuO_{3/2}$, 55.0% $SiO_2$, 24.2% $AlO_{3/2}$),
(10.0% $LuO_{3/2}$, 45.0% $SiO_2$, 45.0% $AlO_{3/2}$),
(20.8% $LuO_{3/2}$, 24.2% $SiO_2$, 55.0% $AlO_{3/2}$), and
(30.0% $LuO_{3/2}$, 25.0% $SiO_2$, 45.0% $AlO_{3/2}$).

An optical material that overcomes the foregoing problems is composed of the glass composition described above.

An optical device that overcomes the foregoing problems includes a light source, and an optical system that irradiates an object with light from the light source, in which the optical system includes an optical member, and in which the optical member includes a base and/or an optical thin film composed of the glass composition described above.

An optical device that overcomes the foregoing problems includes a light source, and an optical system that irradiates an object with light from the light source, in which the optical system includes a first optical member, and a second optical member having a higher refractive index than the first optical member, and in which the second optical member includes a base composed of the glass composition described above.

The light source emits ultraviolet light.

Further features of the present invention will become apparent from the following description of exemplary embodiments with reference to the attached drawings.

DESCRIPTION OF EMBODIMENTS

Embodiments of the present invention will be described in detail below. However, it should be understood that the following description does not limit the scope of the present invention unless otherwise specified.

A glass composition according to aspects of the present invention is an oxide containing Lu, Si, and Al, in which the composition of the glass composition lies within a compositional region of a ternary composition diagram of Lu, Si, and Al in terms of cation percent, the compositional region being defined by the following six points:
(32.3% $LuO_{3/2}$, 30.0% $SiO_2$, 37.7% $AlO_{3/2}$),
(32.3% $LuO_{3/2}$, 37.7% $SiO_2$, 30.0% $AlO_{3/2}$),
(20.8% $LuO_{3/2}$, 55.0% $SiO_2$, 24.2% $AlO_{3/2}$),
(10.0% $LuO_{3/2}$, 45.0% $SiO_2$, 45.0% $AlO_{3/2}$),
(20.8% $LuO_{3/2}$, 24.2% $SiO_2$, 55.0% $AlO_{3/2}$), and
(30.0% $LuO_{3/2}$, 25.0% $SiO_2$, 45.0% $AlO_{3/2}$).

Figure 1:
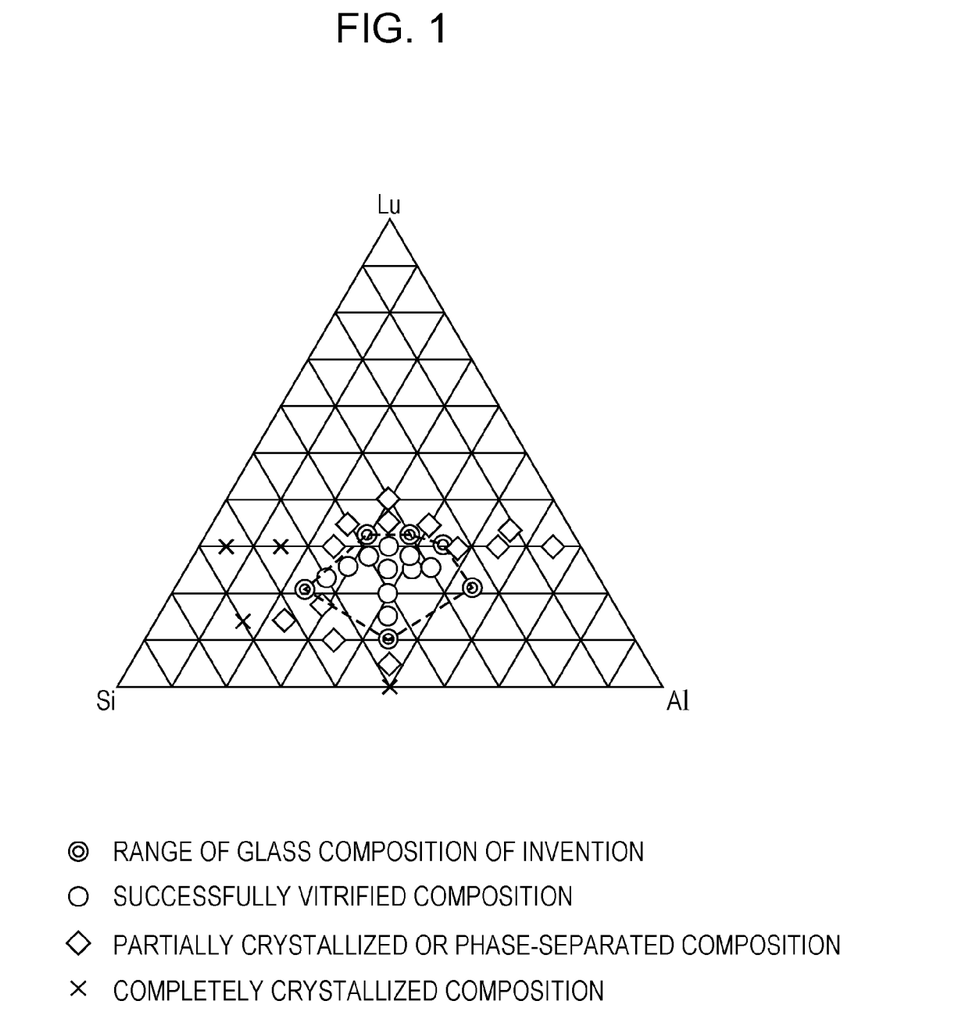
FIG. 1 is a ternary composition diagram of Lu, Si, and Al, in terms of cation percent, in glass compositions of aspects of the present invention.

FIG. 1 is a ternary composition diagram of Lu, Si, and Al, in terms of cation percent, in glass compositions of aspects of the present invention. In FIG. 1, the six points are represented by a double circle, and the compositional region is a region surrounded by a broken line connecting the six points.

In aspects of the present invention, the term "cation percent" indicates the ratio of the number of ions of Lu, Si, or Al to the total number of cations, for example, the sum of the number of Lu ions, the number of Si ions, the number of Al ions, in terms of percent. For example, the cation percent of Lu is defined as the ratio of the number of Lu cations to the sum of the number of cations of Lu, Si, and Al, the Lu cation percent being defined by expression (1):

$$\text{Cation percent of Lu} = [\text{number of Lu ions}/(\text{number of Lu ions} + \text{number of Si ions} + \text{number of Al ions})] \times 100 \qquad (1)$$

Thus, the values of the six points are expressed in terms of cation percent. Specifically, the mole percent of Lu oxide that is not expressed in the form of $Lu_2O_3$ but in the form of one cation, for example, $LuO_{3/2}$, corresponds to cation percent.

Si cation percent and Al cation percent are expressed in the same way as Lu described above.

The glass composition according to aspects of the present invention mainly contains Lu, Si, Al, and O. Vitrification can be reliably accomplished at compositions within the compositional region defined by the six points. Vitrification can be performed by forming a melt having a desired composition and rapidly cooling the melt, a vapor phase synthetic method, e.g., a PVD method or CVD method, or a sol-gel method.

In the glass composition, for the purpose of preventing crystallization and phase separation, the total proportion of Lu, Si, Al, and O is preferably 99.99% by weight and more preferably almost 100% by weight. However, another element may be contained so long as it does not promote crystallization or phase separation and it stabilizes the vitrification.

In the glass composition, for the purpose of improving ultraviolet transmittance, the total proportion of Lu, Si, Al, and O is preferably 99.99% by weight and more preferably almost 100% by weight. However, another element may be contained so long as it does not reduce the ultraviolet transmittance or it promotes the ultraviolet transmittance.

In the case where the proportions of Lu, Si, and Al in terms of cation percent are within the compositional region defined by the six points, a relatively stable, large-sized glass composition is provided. If the proportions are outside the range, the vitrification is unstable, so that crystallization is partially caused, or phase separation occurs.

Figure 2:
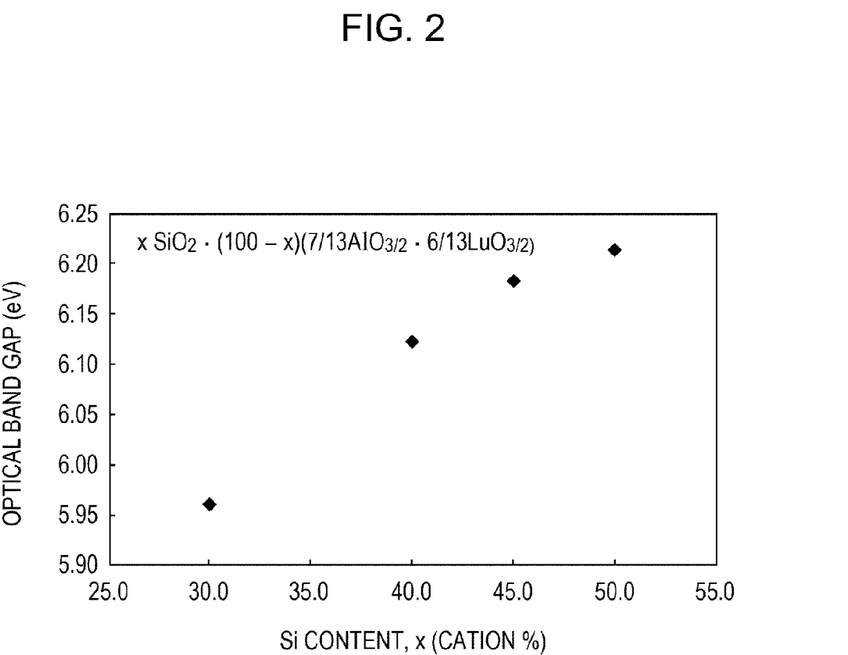
FIG. 2 is a graph illustrating the optical band gap of an $xSiO_2.(100-x)(7/13AlO_{3/2}.6/13LuO_{3/2})$ glass.

FIG. 2 is a graph illustrating the optical band gap of an $xSiO_2 \cdot (100-x)(7/13AlO_{3/2} \cdot 6/13LuO_{3/2})$ glass. FIG. 2 illustrates a change in optical band gap as the $SiO_2$ content is changed within the compositional region defined by the six points. The results demonstrate that the optical band gap decreases with decreasing $SiO_2$ content. This is presumably because the proportion of $SiO_2$, which has the highest band gap among $SiO_2$, $AlO_{3/2}$, and $LuO_{3/2}$, is reduced. Thus, in order to improve the transmittance in the ultraviolet wavelength range, the proportions of the components can satisfy the relationship: $SiO_2$ content>$AlO_{3/2}$ content>$LuO_{3/2}$ content.

Figure 3:
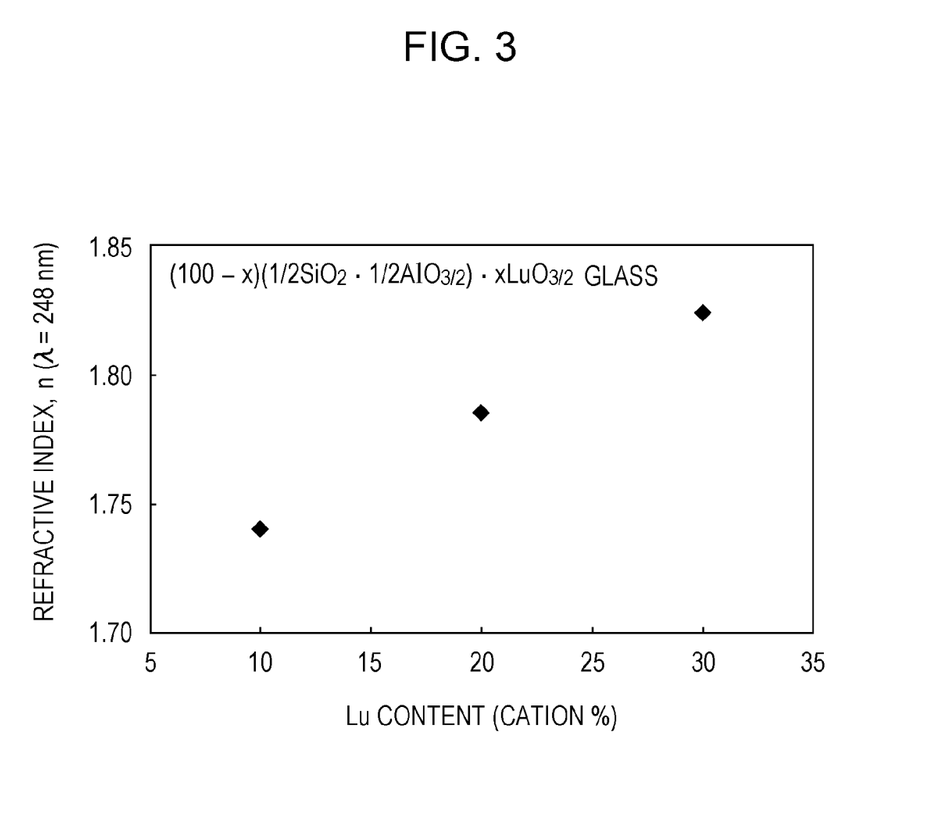
FIG. 3 is a graph illustrating the refractive index of a $(100-x)(1/2SiO_2.1/2AlO_{3/2}).xLuO_{3/2}$ glass at a wavelength of 248 nm.

It is empirically known that there is a trade-off between the band gap and the refractive index. That is, from the viewpoint of improving the refractive index, the proportions of the components can satisfy the relationship: $LuO_{3/2}$ content>$AlO_{3/2}$ content>$SiO_2$ content. FIG. 3 is a graph illustrating the refractive index of a $(100-x)(1/2SiO_2 \cdot 1/2AlO_{3/2}) \cdot xLuO_{3/2}$ glass at a wavelength of 248 nm. FIG. 3 illustrates a change in refractive index at a wavelength of 248 nm as the $LuO_{3/2}$ content is changed within the compositional region defined by the six points. The results demonstrate that the refractive index increases with increasing $LuO_{3/2}$ content.

An impurity often contributes to the inhibition of vitrification, the formation of a defect, and so forth. Thus, the impurity content can be appropriately controlled to be 100 ppm or less. However, such an element may be added so long as it does not inhibit the vitrification and suppresses the formation of the defect. Furthermore, an additional element may be added so long as it has the effect of converting a formed defect into another defect that does not impair the target characteristics. Examples of the additional element include fluorine and hydrogen.

The glass composition according to aspects of the present invention may be used for an optical material and an optical thin film.

Specifically, the glass composition according to aspects of the present invention may be used as a base material of a lens (lens material). Furthermore, the glass composition may be used as a sputtering target for the formation of an optical thin film.

The lens and the optical thin film can be used as optical members that transmit ultraviolet light having a wavelength of 365 nm or less, preferably 248 nm or less, and more preferably 193 nm or less.

An optical device according to aspects of the present invention includes a light source, and an optical system that irradiates an object with light from the light source, in which the optical system includes an optical member, and in which the optical member includes a base and/or an optical thin film composed of the glass composition described above.

Furthermore, an optical device according to aspects of the present invention includes a light source, and an optical system that irradiates an object with light from the light source, in which the optical system includes a first optical member, and a second optical member having a higher refractive index than the first optical member, and in which the second optical member includes a base composed of the glass composition described above.

The light source emits ultraviolet light. The light source can emit ultraviolet light having a wavelength of, for example, 365 nm, 248 nm, or 193 nm.

An exposure apparatus serving as the optical device according to aspects of the present invention includes a light source that emits light in the ultraviolet to vacuum ultraviolet region with a wavelength of 365 nm or less (for example, the i-line with a wavelength of 365 nm, KrF excimer laser light with an oscillation wavelength of 248 nm, and ArF excimer laser light with an oscillation wavelength of 193 nm). This is because a reduction in exposure wavelength and an increase in the numerical aperture of a lens result in a reduction in resolution line width, thereby improving the resolution.

The optical device according to aspects of the present invention can be an immersion projection-type exposure apparatus, in which a liquid is filled between an exposure substrate and a final lens of the exposure apparatus to substantially reduce the wavelength of light on a surface of the exposure substrate, thereby improving the resolution.

The immersion projection-type exposure apparatus includes a light source, an illumination optical system, an optical mask (reticle), a projection optical system, and a liquid supply and recovery unit. Exposure is performed in a state in which a liquid is filled between a lens (final lens) arranged on an end of the projection optical system adjacent to the exposure substrate and the exposure substrate provided with a photosensitive film.

The final lens of the immersion projection-type exposure apparatus is required to have a high refractive index and a high transmittance at a wavelength of light from the light source, low or no intrinsic birefringence or low or no stress birefringence, high resistance to light from the light source, and high resistance to the liquid used. Thus, a lens composed of the glass composition according to aspects of the present invention is used as the final lens. Lenses other than the final lens of the projection optical system are composed of silica glass.

These lenses are provided with antireflective optical thin films, as needed.

Figure 4:
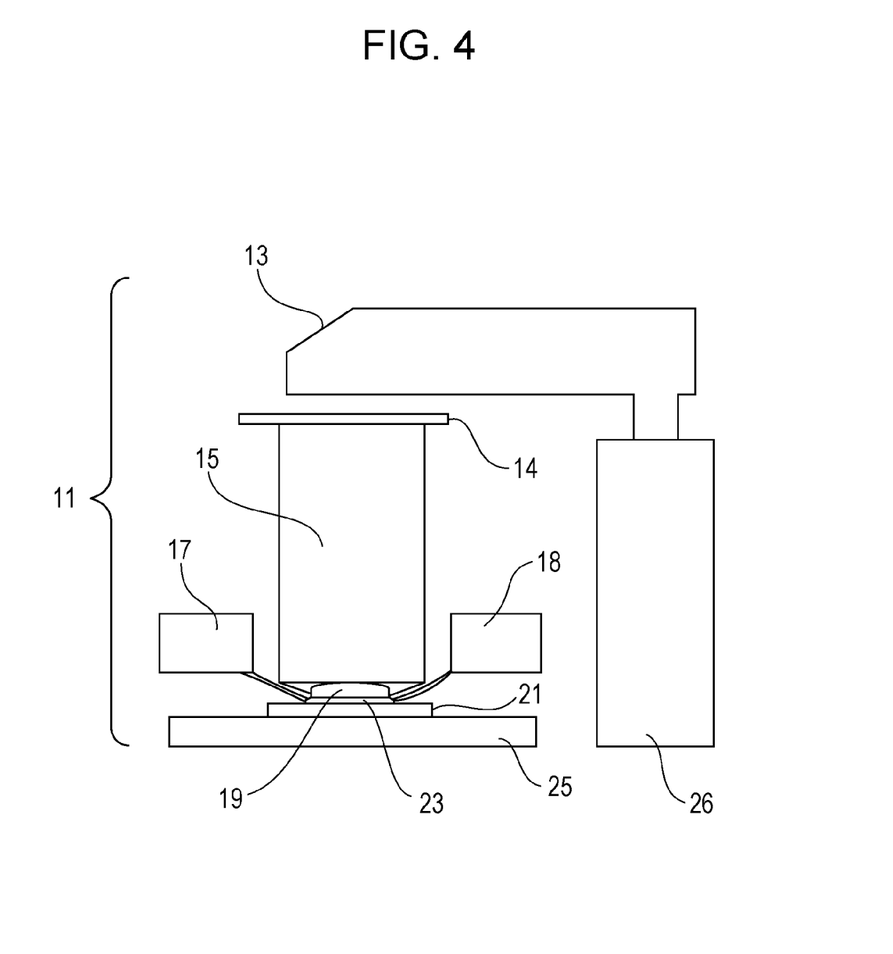
FIG. 4 is a schematic view of an optical device according to an embodiment of the present invention.

FIG. 4 is a schematic view of an immersion projection-type exposure apparatus. In FIG. 4, the immersion projection-type exposure apparatus 11 includes an illumination optical system 13, a projection optical system 15, an optical mask (reticle) 14 arranged between the illumination optical system 13 and the projection optical system 15, liquid supply and recover units 17 and 18, a stage 25 configured to transfer an exposure substrate 21, and a laser light source 26.

The projection optical system 15 includes a lens unit, composed of silica glass, serving as a first optical member with a relatively low refractive index and a final lens 19 arranged on an end of the projection optical system 15 adjacent to the exposure substrate 21, the final lens 19 serving as a second optical member with a relatively high refractive index. Exposure is performed by irradiating the exposure substrate 21 provided with a photosensitive film, which serves as an object, with ultraviolet light from the projection optical system 15 while a liquid 23 is filled between the final lens 19 and the exposure substrate 21 provided with the photosensitive film.

The exposure allows a pattern of the optical mask (reticle) 14 to be reduced and transferred onto the exposure substrate 21. While the liquid 23 is held only between the final lens 19 and the exposure substrate 21 in FIG. 4, the present invention is not limited thereto. According to an embodiment of the present invention, the entire exposure substrate 21 may be immersed in the liquid 23. Examples of the liquid 23 that can be used include pure water having a refractive index (at 20° C.) of 1.44 for light with a wavelength of 193 nm; and fluorine-containing organic solvents.

The immersion projection-type exposure apparatus according to aspects of the present invention can include a laser light source serving as the light source, the laser light source emitting light with a wavelength of 200 nm or less. More specifically, the immersion projection-type exposure apparatus can include an ArF excimer layer oscillator. The use of the short-wavelength light emitted from the light source improves the resolution of the exposure apparatus.

An optical member according to aspects of the present invention can be used as an optical member that transmits vacuum ultraviolet light with a wavelength of 193 nm.

An optical device according to another embodiment of the present invention includes a light source that emits ultraviolet light, and an optical system that irradiates an object with the ultraviolet light from the light source. The optical system includes an optical member. The optical member includes a base and/or an optical thin film composed of a glass composition for ultraviolet light, the glass composition being composed of an oxide containing Lu, Si, and Al. The composition of the glass composition lies within a compositional region of a ternary composition diagram of Lu, Si, and Al in terms of cation percent. The compositional region is defined by the following six points:

(32.3% $LuO_{3/2}$, 30.0% $SiO_2$, 37.7% $AlO_{3/2}$),
(32.3% $LuO_{3/2}$, 37.7% $SiO_2$, 30.0% $AlO_{3/2}$),
(20.8% $LuO_{3/2}$, 55.0% $SiO_2$, 24.2% $AlO_{3/2}$),
(10.0% $LuO_{3/2}$, 45.0% $SiO_2$, 45.0% $AlO_{3/2}$),
(20.8% $LuO_{3/2}$, 24.2% $SiO_2$, 55.0% $AlO_{3/2}$), and
(30.0% $LuO_{3/2}$, 25.0% $SiO_2$, 45.0% $AlO_{3/2}$).

That is, a lens is made of the glass composition for ultraviolet light as a base material. Alternatively, an optical thin film having a high refractive index is formed on a surface of a base composed of a silicon wafer or silica glass by sputtering using a target composed of the glass composition for ultraviolet light, thereby producing an optical member, such as a lens or mirror.

The optical member according to aspects of the present invention can be used as an optical member of an optical device which transmits ultraviolet light having a wavelength of 365 nm or less, preferably 248 nm or less, and more preferably 193 nm or less.

EXAMPLES

The present invention will be described more specifically below by examples.

Example 1

$Lu_2O_3$ (purity: 99.99% by weight), $SiO_2$ (trade name: MKC Silica, manufactured by Nippon Kasei Chemical Company Limited), $Al_2O_3$ (purity: 99.998% by weight) were used as starting materials for glass synthesis. As shown in Table 1, these starting materials, i.e., $Lu_2O_3$, $SiO_2$, and $Al_2O_3$, were weighed in such a manner that a glass composition contained 25.4% Lu, 45.0% Si, and 29.6% Al in terms of cation percent. This point is shown as an open circle in FIG. 1.

Specifically, in the case of a batch weight of 400 mg, in order to obtain a Lu content of 25.4% in terms of cation percent, the weight of $Lu_2O_3$ needed is 218.07 mg. The weight is determined from the following expression:

$$\text{batch weight} \times \left\{ \frac{\left(\frac{\text{molecular weight of } Lu_2O_3}{2}\right) \times}{\text{cation percent of Lu}} \right\} \div \qquad [\text{Math. 1}]$$

$$\left[ \left\{ \frac{\left(\frac{\text{molecular weight of } Lu_2O_3}{2}\right) \times}{\text{cation percent of Lu}} \right\} + \right.$$

$$\{\text{molecular weight of } SiO_2 \times \text{cation percent of Si}\} +$$

$$\left. \left\{ \frac{\left(\frac{\text{molecular weight of } Al_2O_3}{2}\right) \times}{\text{cation percent of Al}} \right\} \right]$$

The cation percent of Si and the cation percent of Al are similarly determined.

The stoichiometric ratios (by mass) of $Lu_2O_3$, $SiO_2$, and $Al_2O_3$, i.e., $Lu_2O_3:SiO_2:Al_2O_3$, is 3.345:1.791:1.000. However, $SiO_2$ sublimes when melted, thus reducing the $SiO_2$ content. For this reason, the proportion of $SiO_2$ in the starting materials was appropriately adjusted. The starting materials were sufficiently mixed in a mortar. The resulting mixture was partially melted by irradiation with $CO_2$ laser light. Then the laser output power is reduced to produce a spherical polycrystalline aggregate 1.

Figure 5:
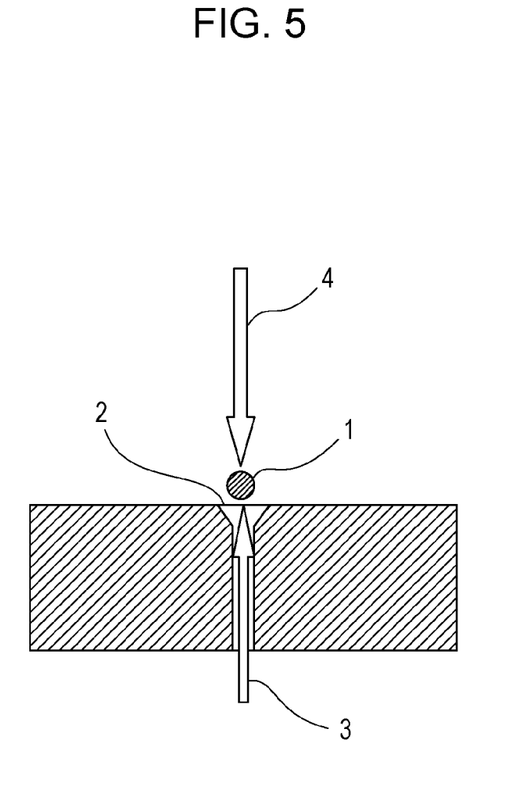
FIG. 5 is a schematic view of a gas jet levitation device.

The polycrystalline aggregate 1 was placed on a copper nozzle 2 of a gas jet levitation device illustrated in FIG. 5. The polycrystalline aggregate 1 was heated again with a $CO_2$ laser 4 while the polycrystalline aggregate 1 was floated using dry air 3, thereby completely melting the polycrystalline aggregate 1. In this state, the output of the laser was stopped to rapidly cool the sample, thereby providing a transparent spherical body. This process was monitored by a radiation pyrometer. No exothermic reaction due to crystallization was observed.

Example 2

$Lu_2O_3$ (purity: 99.99% by weight), $SiO_2$ (trade name: MKC Silica, manufactured by Nippon Kasei Chemical Company Limited), $Al_2O_3$ (purity: 99.998% by weight) were used as starting materials for glass synthesis. As shown in Table 1, these starting materials, i.e., $Lu_2O_3$, $SiO_2$, and $Al_2O_3$, were weighed in such a manner that a glass composition contained 25.4% Lu, 29.6% Si, and 45.0% Al in terms of cation percent. This point is shown as an open circle in FIG. 1.

The stoichiometric ratios (by mass) of $Lu_2O_3$, $SiO_2$, and $Al_2O_3$, i.e., $Lu_2O_3:SiO_2:Al_2O_3$, is 2.202:0.776:1.000. However, $SiO_2$ sublimes when melted, thus reducing the $SiO_2$ content. For this reason, the proportion of $SiO_2$ in the starting materials was appropriately adjusted. The starting materials were sufficiently mixed in a mortar. The resulting mixture was partially melted by irradiation with $CO_2$ laser light. Then the laser output power is reduced to produce a spherical polycrystalline aggregate 1.

The polycrystalline aggregate 1 was placed on a gas jet levitation device. The polycrystalline aggregate 1 was heated again with a $CO_2$ laser while the polycrystalline aggregate 1 was floated using dry air 3, thereby completely melting the polycrystalline aggregate 1. In this state, the output of the laser was stopped to rapidly cool the sample, thereby providing a transparent spherical glass.

Example 3

Lu$_2$O$_3$ (purity: 99.99% by weight), SiO$_2$ (trade name: MKC Silica, manufactured by Nippon Kasei Chemical Company Limited), Al$_2$O$_3$ (purity: 99.998% by weight) were used as starting materials for glass synthesis. As shown in Table 1, these starting materials, i.e., Lu$_2$O$_3$, SiO$_2$, and Al$_2$O$_3$, were weighed in such a manner that a glass composition contained 15.0% Lu, 42.5% Si, and 42.5% Al in terms of cation percent. This point is shown as an open circle in FIG. 1. The stoichiometric ratios (by mass) of Lu$_2$O$_3$, SiO$_2$, and Al$_2$O$_3$, i.e., Lu$_2$O$_3$:SiO$_2$:Al$_2$O$_3$, is 1.377:1.179:1.000. However, SiO$_2$ sublimes when melted, thus reducing the SiO$_2$ content. For this reason, the proportion of SiO$_2$ in the starting materials was appropriately adjusted. The starting materials were sufficiently mixed in a mortar. The resulting mixture was partially melted by irradiation with CO$_2$ laser light. Then the laser output power is reduced to produce a spherical polycrystalline aggregate 1.

The polycrystalline aggregate 1 was placed on a gas jet levitation device. The polycrystalline aggregate 1 was heated again with the CO$_2$ laser 4 while the polycrystalline aggregate 1 was floated using dry air 3, thereby completely melting the polycrystalline aggregate 1. In this state, the output of the laser was stopped to rapidly cool the sample, thereby providing a transparent spherical glass.

Examples 4 to 16

Lu$_2$O$_3$, SiO$_2$, and Al$_2$O$_3$ were weighed in such a manner that compositions of Examples 4 to 16 described in Table 1 were achieved in terms of cation percent. The polycrystalline aggregate 1 was produced from each of the compositions in the same way as above. These points were shown as double circles and open circles in FIG. 1. The double circles indicate the points of Examples 4, 8, 9, 11, 13, and 16. The open circles indicate the points of Examples 5, 6, 7, 10, 12, 14, and 15.

Comparative Example 1

Lu$_2$O$_3$ (purity: 99.99% by weight), SiO$_2$ (trade name: MKC Silica, manufactured by Nippon Kasei Chemical Company Limited), Al$_2$O$_3$ (purity: 99.998% by weight) were used as starting materials for glass synthesis. As shown in Table 1, these starting materials, i.e., Lu$_2$O$_3$, SiO$_2$, and Al$_2$O$_3$, were weighed in such a manner that a glass composition contained 33.3% Lu, 11.1% Si, and 55.6% Al in terms of cation percent. This point is shown as an open rhombus in FIG. 1. The stoichiometric ratios (by mass) of Lu$_2$O$_3$, SiO$_2$, and Al$_2$O$_3$, i.e., Lu$_2$O$_3$:SiO$_2$:Al$_2$O$_3$, is 2.342:0.236:1.000. However, SiO$_2$ sublimes when melted, thus reducing the SiO$_2$ content. For this reason, the proportion of SiO$_2$ in the starting materials was appropriately adjusted. The starting materials were sufficiently mixed in a mortar. The resulting mixture was partially melted by irradiation with CO$_2$ laser light. Then the laser output power is reduced to produce a spherical polycrystalline aggregate 1.

The polycrystalline aggregate 1 was placed on a gas jet levitation device. The polycrystalline aggregate 1 was heated again with the CO$_2$ laser 4 while the polycrystalline aggregate 1 was floated using dry air 3, thereby completely melting the polycrystalline aggregate 1. In this state, the output of the laser was stopped to rapidly cool the sample. The recovered sample contained a transparent portion and an opaque portion. This demonstrated that a polycrystal was formed.

Comparative Example 2

Lu$_2$O$_3$ (purity: 99.99% by weight), SiO$_2$ (trade name: MKC Silica, manufactured by Nippon Kasei Chemical Company Limited), Al$_2$O$_3$ (purity: 99.998% by weight) were used as starting materials for glass synthesis. As shown in Table 1, these starting materials, i.e., Lu$_2$O$_3$, SiO$_2$, and Al$_2$O$_3$, were weighed in such a manner that a glass composition contained 29.0% Lu, 22.6% Si, and 48.4% Al in terms of cation percent. This point is shown as an open rhombus in FIG. 1. The stoichiometric ratios (by mass) of Lu$_2$O$_3$, SiO$_2$, and Al$_2$O$_3$, i.e., Lu$_2$O$_3$:SiO$_2$:Al$_2$O$_3$, is 2.342:0.550:1.000. However, SiO$_2$ sublimes when melted, thus reducing the SiO$_2$ content. For this reason, the proportion of SiO$_2$ in the starting materials was appropriately adjusted. The starting materials were sufficiently mixed in a mortar. The resulting mixture was partially melted by irradiation with CO$_2$ laser light. Then the laser output power is reduced to produce a spherical polycrystalline aggregate 1.

The polycrystalline aggregate 1 was placed on a gas jet levitation device. The polycrystalline aggregate 1 was heated again with the CO$_2$ laser 4 while the polycrystalline aggregate 1 was floated using dry air 3, thereby completely melting the polycrystalline aggregate 1. In this state, the output of the laser was stopped to rapidly cool the sample. The recovered sample contained a transparent portion and an opaque portion. This demonstrated that a polycrystal was formed.

Comparative Example 3

Lu$_2$O$_3$ (purity: 99.99% by weight), SiO$_2$ (trade name: MKC Silica, manufactured by Nippon Kasei Chemical Company Limited), Al$_2$O$_3$ (purity: 99.998% by weight) were used as starting materials for glass synthesis. As shown in Table 1, these starting materials, i.e., Lu$_2$O$_3$, SiO$_2$, and Al$_2$O$_3$, were weighed in such a manner that a glass composition contained 30.0% Lu, 45.0% Si, and 25.0% Al in terms of cation percent. This point is shown as an open rhombus in FIG. 1. The stoichiometric ratios (by mass) of Lu$_2$O$_3$, SiO$_2$, and Al$_2$O$_3$, i.e., Lu$_2$O$_3$:SiO$_2$:Al$_2$O$_3$, is 4.683:2.121:1.000. However, SiO$_2$ sublimes when melted, thus reducing the SiO$_2$ content. For this reason, the proportion of SiO$_2$ in the starting materials was appropriately adjusted. The starting materials were sufficiently mixed in a mortar. The resulting mixture was partially melted by irradiation with CO$_2$ laser light. Then the laser output power is reduced to produce a spherical polycrystalline aggregate 1.

The polycrystalline aggregate 1 was placed on a gas jet levitation device. The polycrystalline aggregate 1 was heated again with the CO$_2$ laser 4 while the polycrystalline aggregate 1 was floated using dry air 3, thereby completely melting the polycrystalline aggregate 1. In this state, the output of the laser was stopped to rapidly cool the sample. The recovered sample contained a transparent portion and an opaque portion. This demonstrated that a polycrystal was formed.

Comparative Example 4

Lu$_2$O$_3$ (purity: 99.99% by weight), SiO$_2$ (trade name: MKC Silica, manufactured by Nippon Kasei Chemical Company Limited), Al$_2$O$_3$ (purity: 99.998% by weight) were used as starting materials for glass synthesis. These starting materials, i.e., Lu$_2$O$_3$, SiO$_2$, and Al$_2$O$_3$, were weighed in such a manner that a glass composition contained 5.0% Lu, 47.5% Si, and 47.5% Al in terms of cation percent. This point is shown as an open rhombus in FIG. 1. The stoichiometric ratios (by mass) of Lu$_2$O$_3$, SiO$_2$, and Al$_2$O$_3$, i.e., Lu$_2$O$_3$:SiO$_2$:

$Al_2O_3$, is 0.411:1.179:1.000. However, $SiO_2$ sublimes when melted, thus reducing the $SiO_2$ content. For this reason, the proportion of $SiO_2$ in the starting materials was appropriately adjusted. The starting materials were sufficiently mixed in a mortar. The resulting mixture was partially melted by irradiation with $CO_2$ laser light. Then the laser output power is reduced to produce a spherical polycrystalline aggregate 1.

The polycrystalline aggregate 1 was placed on a gas jet levitation device. The polycrystalline aggregate 1 was heated again with the $CO_2$ laser 4 while the polycrystalline aggregate 1 was floated using dry air 3, thereby completely melting the polycrystalline aggregate 1. In this state, the output of the laser was stopped to rapidly cool the sample. The recovered sample contained a transparent portion and an opaque portion. This demonstrated that a polycrystal was formed.

Comparative Examples 5 to 17

$Lu_2O_3$, $SiO_2$, and $Al_2O_3$ were weighed in such a manner that compositions of Comparative Examples 5 to 17 described in Table 1 were achieved in terms of cation percent. The polycrystalline aggregate 1 was produced from each of the compositions in the same way as above. These points were shown as open rhombuses and crosses.

TABLE 1

|  | Cation percent of Lu $LuO_{3/2}$ | Cation percent of Si $SiO_2$ | Cation percent of Al $AlO_{3/2}$ | Vitrified state | Symbol in FIG. 1 |
|---|---|---|---|---|---|
| Example 1 | 25.4 | 45.0 | 29.6 | vitrified | open circle |
| Example 2 | 25.4 | 29.6 | 45.0 | vitrified | open circle |
| Example 3 | 15.0 | 42.5 | 42.5 | vitrified | open circle |
| Example 4 | 20.8 | 55.0 | 24.2 | vitrified | double circle |
| Example 5 | 23.1 | 50.0 | 26.9 | vitrified | open circle |
| Example 6 | 27.7 | 40.0 | 32.3 | vitrified | open circle |
| Example 7 | 30.0 | 35.0 | 35.0 | vitrified | open circle |
| Example 8 | 32.3 | 30.0 | 37.7 | vitrified | double circle |
| Example 9 | 32.3 | 37.7 | 30.0 | vitrified | double circle |
| Example 10 | 27.7 | 32.3 | 40.0 | vitrified | open circle |
| Example 11 | 20.8 | 24.2 | 55.0 | vitrified | double circle |
| Example 12 | 25.0 | 37.5 | 37.5 | vitrified | open circle |
| Example 13 | 20.0 | 40.0 | 40.0 | vitrified | double circle |
| Example 14 | 10.0 | 45.0 | 45.0 | vitrified | open circle |
| Example 15 | 25.0 | 33.3 | 41.7 | vitrified | open circle |
| Example 16 | 30.0 | 25.0 | 45.0 | vitrified | double circle |
| Comparative Example 1 | 33.3 | 11.1 | 55.6 | partially crystallized | open rhombus |
| Comparative Example 2 | 29.0 | 22.6 | 48.4 | partially crystallized | open rhombus |
| Comparative Example 3 | 30.0 | 45.0 | 25.0 | partially crystallized | open rhombus |
| Comparative Example 4 | 5.0 | 47.5 | 47.5 | partially crystallized | open rhombus |
| Comparative Example 5 | 40.0 | 30.0 | 30.0 | partially crystallized | open rhombus |
| Comparative Example 6 | 35.0 | 32.5 | 32.5 | partially crystallized | open rhombus |
| Comparative Example 7 | 34.6 | 25.0 | 40.4 | partially crystallized | open rhombus |
| Comparative Example 8 | 34.6 | 40.4 | 25.0 | partially crystallized | open rhombus |
| Comparative Example 9 | 0.0 | 50.0 | 50.0 | crystallized | cross |
| Comparative Example 10 | 17.6 | 52.9 | 29.4 | partially phase-separated | open rhombus |
| Comparative Example 11 | 14.1 | 62.4 | 23.5 | partially crystallized | open rhombus |
| Comparative Example 12 | 30.0 | 5.0 | 65.0 | partially crystallized | open rhombus |
| Comparative Example 13 | 30.0 | 15.0 | 55.0 | partially crystallized | open rhombus |
| Comparative Example 14 | 30.0 | 55.0 | 15.0 | crystallized | cross |
| Comparative Example 15 | 30.0 | 65.0 | 5.0 | crystallized | cross |
| Comparative Example 16 | 10.0 | 55.0 | 35.0 | partially crystallized | open rhombus |
| Comparative Example 17 | 13.9 | 70.0 | 16.2 | crystallized | cross |

In FIG. 1, the compositional region of the glass composition was determined from the ease of vitrification when the polycrystalline aggregate 1 having a diameter of 4 mm was melted and then rapidly cooled using the gas jet levitation device illustrated in FIG. 5. That is, vitrification can be reliably accomplished within the compositional region surrounded by the broken line in FIG. 1. In contrast, in a region outside the compositional region, a glass is partially crystallized, phase separation occurs, or a glass is completely crystallized.

Figure 6:
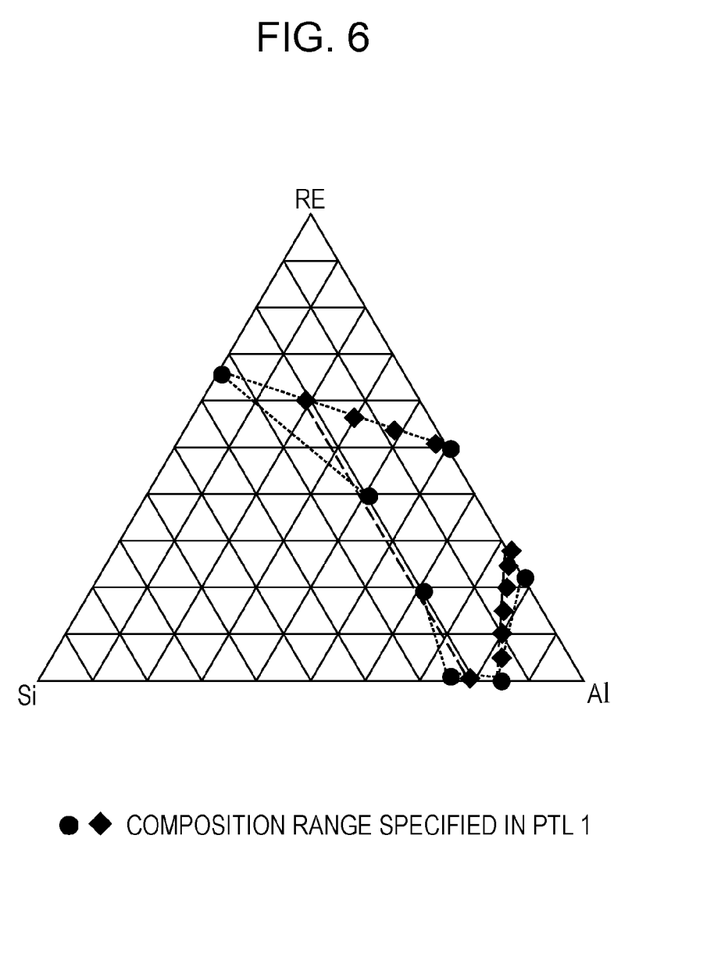
FIG. 6 is a ternary composition diagram of glass compositions of the related art.

Compositional regions surrounded by a dotted line and a broken line connecting the closed circles and the closed rhombuses, respectively, in FIG. 6 are disclosed in PTL 1. The compositional region of the glass composition according to aspects of the present invention shown in FIG. 1 is different from the compositional regions of the glass compositions described in PTL 1 shown in FIG. 6.

FIG. 1 demonstrates that vitrification is relatively reliably accomplished within the compositional region defined by the points represented by the double circles according to aspects of the present invention. In the compositional region defined by the six points represented by the double circles, vitrification is relatively reliably accomplished at a composition in the middle of the compositional region. At that composition, a large-sized glass can be produced.

The glass composition according to aspects of the present invention has suppressed intrinsic birefringence and may be used as a material for an optical member, such as a lens for ultraviolet light in addition to a lens for visible light.

Aspects of the present invention provide a glass composition in which a glassy state having low or no intrinsic birefringence in the ultraviolet region is stably obtained.

Aspects of the present invention provide an optical material, an optical thin film, and an optical device using the glass composition.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-043331, filed Feb. 26, 2010, which is hereby incorporated by reference herein in its entirety.

The invention claimed is:

1. A glass composition comprising:
an oxide containing oxides of Lu, Si, and Al,
wherein the composition of the glass composition lies within a compositional region of a ternary composition diagram of Lu, Si, and Al in terms of cation percent, the compositional region being defined by the following six points:
(32.3% $LuO_{3/2}$, 30.0% $SiO_2$, 37.7% $AlO_{3/2}$),
(32.3% $LuO_{3/2}$, 37.7% $SiO_2$, 30.0% $AlO_{3/2}$),
(20.8% $LuO_{3/2}$, 55.0% $SiO_2$, 24.2% $AlO_{3/2}$),
(10.0% $LuO_{3/2}$, 45.0% $SiO_2$, 45.0% $AlO_{3/2}$),
(20.8% $LuO_{3/2}$, 24.2% $SiO_2$, 55.0% $AlO_{3/2}$), and
(30.0% $LuO_{3/2}$, 25.0% $SiO_2$, 45.0% $AlO_{3/2}$).

2. An optical material comprising:
the glass composition according to claim 1.

3. An optical thin film comprising:
the glass composition according to claim 1.

4. An optical device comprising:
a light source; and
an optical system that irradiates an object with light from the light source,
wherein the optical system includes an optical member, and
wherein the optical member includes
a base and/or an optical thin film composed of the glass composition according to claim 1.

5. The optical device according to claim 4,
wherein the light source emits ultraviolet light.

6. An optical device comprising:
a light source; and
an optical system that irradiates an object with light from the light source,
wherein the optical system includes
a first optical member; and
a second optical member having a higher refractive index than the first optical member, and
wherein the second optical member includes a base composed of the glass composition according to claim 1.

7. The optical device according to claim 6,
wherein the light source emits ultraviolet light.

8. The glass composition according to claim 1,
wherein the total proportion of Lu, Si, Al, and O is at least 99.99% by weight.

* * * * *